(12) United States Patent
Bynam et al.

(10) Patent No.: US 9,059,790 B2
(45) Date of Patent: Jun. 16, 2015

(54) ULTRA-WIDE BAND COMMUNICATION APPARATUS AND METHOD

(75) Inventors: Kiran Bynam, Bangalore (IN); Giriraj Goyal, Bangalore (IN); Thenmozhi Arunan, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 131 days.

(21) Appl. No.: 13/521,604

(22) PCT Filed: Jan. 11, 2011

(86) PCT No.: PCT/KR2011/000182
§ 371 (c)(1),
(2), (4) Date: Jul. 11, 2012

(87) PCT Pub. No.: WO2011/084035
PCT Pub. Date: Jul. 14, 2011

(65) Prior Publication Data
US 2012/0294334 A1  Nov. 22, 2012

(30) Foreign Application Priority Data

Jan. 11, 2010 (IN) .............................. 68/CHE/2010

(51) Int. Cl.
*H04B 1/00* (2006.01)
*H04B 1/7176* (2011.01)
*H04B 14/02* (2006.01)
*H04L 27/18* (2006.01)
*H04L 27/20* (2006.01)

(52) U.S. Cl.
CPC ............ *H04B 1/7176* (2013.01); *H04B 14/026* (2013.01); *H04L 27/18* (2013.01); *H04L 27/2071* (2013.01)

(58) Field of Classification Search
None
See application file for complete search history.

(56) References Cited

U.S. PATENT DOCUMENTS

| 5,694,415 A * | 12/1997 | Suzuki et al. ................. 375/279 |
| 6,320,897 B1 * | 11/2001 | Fattouche et al. ............. 375/130 |
| 6,563,881 B1 * | 5/2003 | Sakoda et al. ................ 375/260 |

(Continued)

FOREIGN PATENT DOCUMENTS

| CN | 1491510 | 4/2004 |
| CN | 101536331 | 9/2009 |

(Continued)

OTHER PUBLICATIONS

IEEE Standard 802.15.4a, Part 15.4: Wireless Medium Access Control (MAC) and Physical Layer (PHY) Specifications for Low-Rate Wireless Personal Area Networks (WPANs), IEEE, 2007.*

(Continued)

*Primary Examiner* — Santiago Garcia
(74) *Attorney, Agent, or Firm* — The Farrell Law Firm, PC

(57) ABSTRACT

The present invention provides an ultra-wide band (UWB) system and method. In one embodiment, a transmitter of a low duty cycled ultra wide band (UWB) system includes a differential spreading encoder for encoding a phase of a bit sequence based on a reference bit sequence. The transmitter also includes a pulse generator for generating a number of pulses associated the bit sequence using the encoded phase of the bit sequence, where the number of pulses is equal to a length of the bit sequence. Moreover, the transmitter includes a DMPSK modulator for generating a modulated signal through modulating the number of pulses using a phase of a differential data symbol.

22 Claims, 4 Drawing Sheets

(56) References Cited

U.S. PATENT DOCUMENTS

| | | | |
|---|---|---|---|
| 7,724,850 B2* | 5/2010 | Kroeger et al. | 375/347 |
| 8,314,688 B2* | 11/2012 | Pahlavan et al. | 340/12.51 |
| 8,498,196 B2* | 7/2013 | Garcia et al. | 370/208 |
| 2004/0017841 A1* | 1/2004 | Siwiak | 375/146 |
| 2004/0063399 A1* | 4/2004 | Milbar | 455/3.01 |
| 2004/0091031 A1* | 5/2004 | Dodgson et al. | 375/222 |
| 2004/0223556 A1* | 11/2004 | Choi | 375/295 |
| 2005/0058102 A1* | 3/2005 | Santhoff et al. | 370/335 |
| 2005/0259720 A1* | 11/2005 | McCorkle et al. | 375/130 |
| 2007/0047626 A1* | 3/2007 | Elias | 375/141 |
| 2007/0153877 A1 | 7/2007 | Siwiak | |
| 2008/0112512 A1 | 5/2008 | Ekbal et al. | |
| 2009/0060098 A1* | 3/2009 | Li et al. | 375/341 |
| 2009/0092250 A1* | 4/2009 | Lablans | 380/255 |
| 2009/0168845 A1 | 7/2009 | Fleming et al. | |
| 2009/0323845 A1* | 12/2009 | Bank et al. | 375/261 |
| 2010/0310009 A1* | 12/2010 | Lakkis | 375/308 |
| 2011/0020013 A1 | 1/2011 | Griffin | |
| 2013/0308721 A1* | 11/2013 | Garcia et al. | 375/295 |

FOREIGN PATENT DOCUMENTS

| | | |
|---|---|---|
| JP | 2006-516369 | 6/2006 |
| JP | 2006-325099 | 11/2006 |
| WO | WO 2009/127036 | 10/2009 |

OTHER PUBLICATIONS

PCT/ISA/237 Written Opinion issued on PCT/KR2011/000182 (pp. 5).

PCT/ISA/210 Search Report issued on PCT/KR2011/000182 (pp. 3).

\* cited by examiner

[Fig. 5]

ULTRA-WIDE BAND COMMUNICATION APPARATUS AND METHOD

PRIORITY

This application is a National Phase Entry of PCT International Application No. PCT/KR2011/000182, which was filed on Jan. 11, 2011, and claims priority to Indian Patent Application No. 68/CHE/2010, which was filed on Jan. 11, 2010, the content of each of which is incorporated herein by reference.

TECHNICAL FIELD

The present invention relates to an ultra-wide band system, and more particularly relates to ultra-wide band communication apparatus and method.

BACKGROUND ART

Ultra-wideband (UWB) is a radio technology that can be used at very low energy levels for short-range high-bandwidth communications by using a large portion of the radio spectrum. The UWB radio spectrum typically spans from 3.1 to 10.6 GHz. As per the regulations set by the various regulatory authorities, an UWB signal should have a minimum of 500 MHz bandwidth at the output of an UWB transmitter antenna with a maximum power spectral density of −41.3 dBm/MHz. Further, the UWB system should support a low duty cycle of less than 5% in one hour time.

Typically, in a low duty cycled UWB system, an UWB transmitter modulates an UWB signal including a chirp pulse or a "series of short pulses" using a DMPSK modulation technique and transmits the UWB signal to an UWB receiver using an UWB network. The chirp pulse is a frequency modulated carrier pulse where a modulating signal is a triangular waveform. The chirp pulse spans larger bandwidths (>=500 MHz) and has excellent autocorrelation properties. The UWB receiver may mix and filter the incoming UWB signal to remove chirp signal from the incoming UWB signal. Further, the UWB receiver demodulates the incoming UWB signal using any of conventional DMPSK demodulation techniques. A "series of short pulses" means a stream of Gaussian monocycles repeated for a certain period of time equal to on time of the symbol.

DISCLOSURE OF INVENTION

Technical Problem

Alternatively, the UWB receiver demodulates the incoming UWB signal using a differentially demodulated phase shift keying (DDPSK) demodulation technique without requiring to perform initial channel estimation. The UWB receiver differentiates consecutive pulses sample by sample and average the differential samples to obtain phase difference between the correlated pulses. However, in this technique, the UWB receiver may have to estimate timing of most significant tap of channel for achieving better performance.

IEEE 802.15.6 (a standard designed for body area networks) provides a pulse (e.g., chirp or series of short pulses) based physical layer in UWB band to demodulate the incoming UWB signal with better performance and low power consumption. However, different filters are required to be employed when a width of the chirp pulse in the incoming UWB signal changes with different data rates. Also, the UWB receiver needs to adapt to re-synchronization requirements before decoding the incoming UWB signal. Further, change in widths of the chirp pulses changes with the different data rates demands different sampling rates at ADC of the UWB receiver and DAC of the UWB transmitter. As a consequence, a complexity of the UWB transmitter increases with varying data rates.

One of the currently known solutions uses convolutional codes to solve above described problems associated with scalable data rates. However, a decoder used for handling scalable data rates using convolutional codes adds to a total cost of the UWB receiver.

Solution to Problem

The present invention provides an ultra-wide band (UWB) system and method. In one aspect, a method of a low duty cycled UWB transmitter for generating a modulated signal includes encoding a phase of a bit sequence based on a reference bit sequence using a differential spreading encoder of the low duty cycled UWB transmitter. The method includes generating a number of pulses associated with the bit sequence based on the encoded phase of the bit sequence using a pulse generator of the low duty cycled UWB transmitter, where the number of pulses is equal to a length of the bit sequence. Moreover, the method includes generating a modulated signal through modulating the number of pulses using a phase of a differential data symbol by a DMPSK modulator of the low duty cycled UWB transmitter.

The method may include selecting a random phase value from DMPSK table using the encoded phase of the bit sequence by a phase detector of the low duty cycled UWB transmitter. Additionally, the method may include scrambling the modulated signal by multiplying the random phase value with the phase value of the modulated signal using a bit scrambler of the low duty cycled UWB transmitter.

In another aspect, a transmitter of a low duty cycled UWB system includes a differential spreading encoder for encoding a phase of a bit sequence based on a reference bit sequence. The transmitter also includes a pulse generator for generating a number of pulses associated the bit sequence using the encoded phase of the bit sequence, wherein the number of pulses is equal to a length of the bit sequence. Further, the transmitter includes a DMPSK modulator for generating a modulated signal through modulating the number of pulses using a phase of a differential data symbol.

Additionally, the transmitter may include a phase detector for selecting a random phase value from DMPSK table using the encoded phase of the bit sequence. Moreover, the transmitter may include a bit scrambler for scrambling the modulated signal by multiplying the random phase value with the phase value of the modulated signal.

In yet another aspect, a method of a low duty cycled UWB receiver for processing a baseband signal received via an UWB network includes obtaining a spreading sequence having desired cyclic autocorrelation properties modulated with a differential data symbol through dividing a current modulated baseband data symbol associated with the baseband signal by a previous modulated baseband data symbol using a differentiator. The method also includes obtaining a differential data symbol by multiplying a reference spreading sequence with the spreading sequence having desired cyclic autocorrelation properties modulated with the differential data symbol using a despreader.

The method may include descrambling the received baseband signal to eliminate a random pulse value in the received baseband signal using a de-scrambler. Additionally, the method may include filtering one or more frequencies from the spreading sequence having desired cyclic autocorrelation properties modulated with the differential data symbol to eliminate residual pulse shape frequency characteristics.

In a further aspect, a receiver of a low duty cycled UWB system includes a differentiator for obtaining a spreading sequence having desired cyclic autocorrelation properties modulated with a differential data symbol through dividing a current modulated baseband data symbol associated with the baseband signal by a previous modulated baseband data symbol. The receiver also includes a de-spreader for obtaining a differential data symbol by multiplying a reference spreading sequence with the spreading sequence having desired cyclic autocorrelation properties modulated with the differential data symbol.

Further, the receiver may include a bit descrambler for descrambling the received baseband signal to eliminate a random pulse value in the received baseband signal. Additionally, the receiver may include a low pass filter for filtering one or more frequencies from the spreading sequence having desired cyclic autocorrelation properties modulated with the differential data symbol to eliminate residual pulse shape frequency characteristics.

Other features of the embodiments will be apparent from the accompanying drawings and from the detailed description that follows.

Advantageous Effects of Invention

The present invention provides an adaptable ultra-wide band (UWB) system and method.

BRIEF DESCRIPTION OF DRAWINGS

FIG. 5 illustrates an operation process of an exemplary an receiver transmitter in a pulse based low duty cycled UWB system, according to one embodiment.

MODE FOR THE INVENTION

The present invention provides an ultra-wide band communication system and method. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
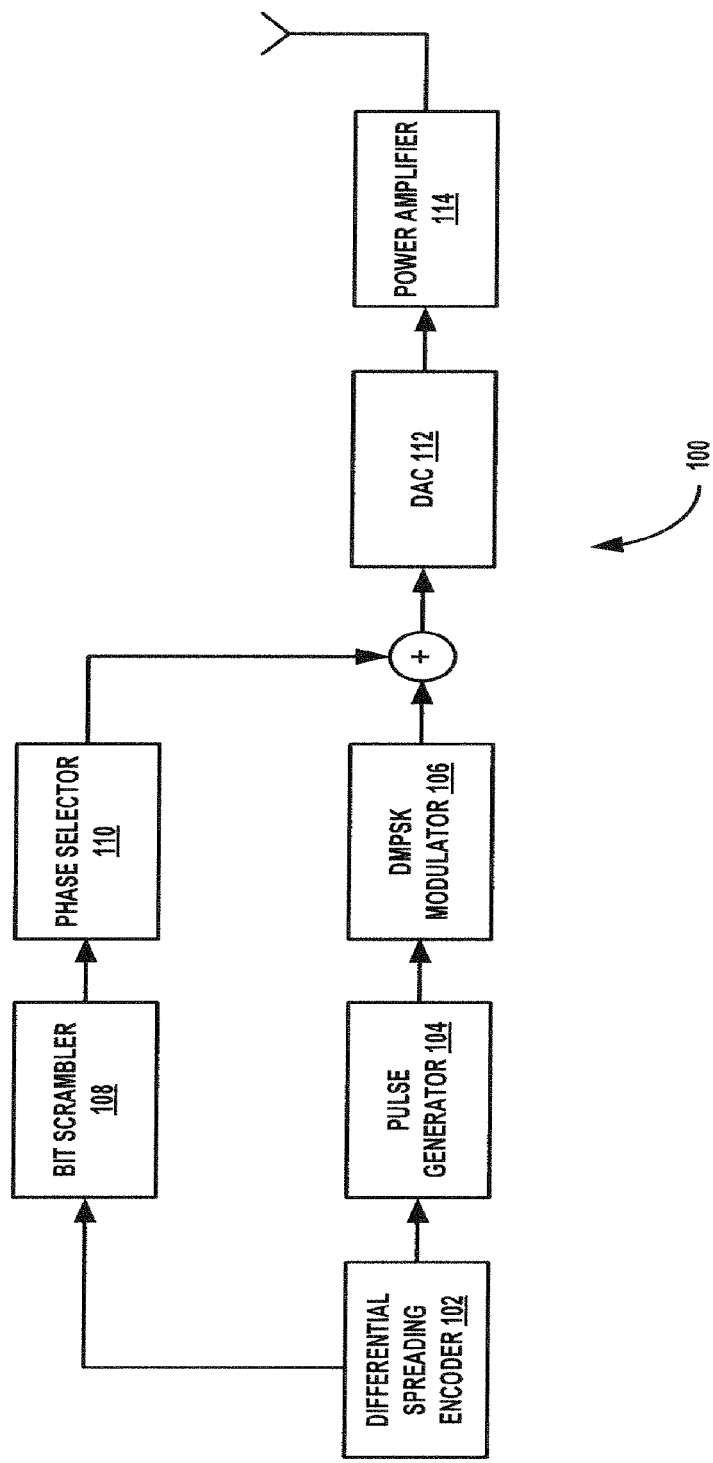
FIG. 1 illustrates a block diagram of an exemplary transmitter in a pulse based low duty cycled ultra-wide band (UWB) system, according to one embodiment.
Figure 4:
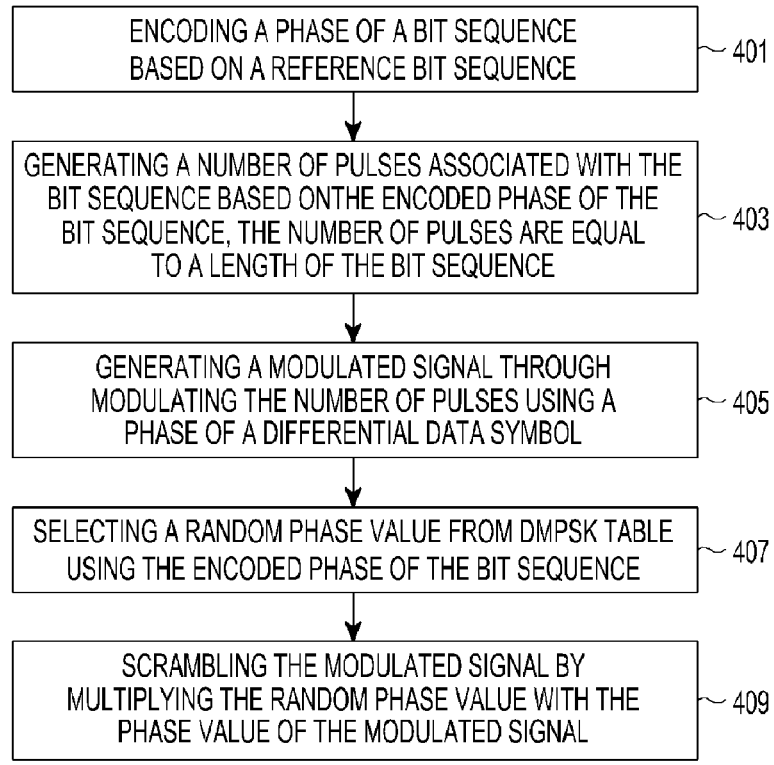
FIG. 4 illustrates an operation process of an exemplary transmitter in a pulse based low duty cycled UWB system, according to one embodiment.
Figure 4:
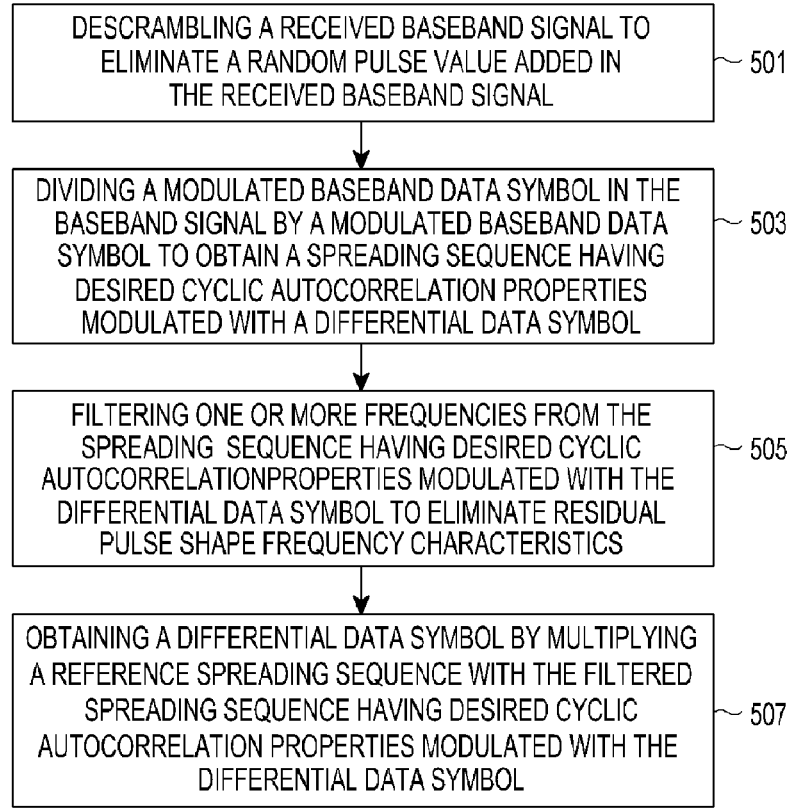

FIG. 1 illustrates a block diagram of a transmitter 100 in a pulse based low duty cycled ultra-wide band (UWB) system, according to one embodiment. FIG. 4 illustrates an operation process of an exemplary transmitter in a pulse based low duty cycled UWB system, according to one embodiment. In FIG. 1, the transmitter 100 includes a differential spreading encoder 102, a pulse generator 104, a differentially modulated phase shift keying (DMPSK) modulator 106, a bit scrambler 108, a phase detector 110, a digital to analogue converter 112, and a power amplifier 114.

In an exemplary operation, the differential spreading encoder 102 encodes a phase of a bit sequence based on a reference bit sequence stored in memory associated with the differential spreading encoder 102(step 401 in the FIG. 4). In one exemplary implementation, the reference bit sequence may be a predefined bit sequence stored in the memory and used for encoding a phase of a first bit sequence. In another exemplary implementation, the reference bit sequence may be a previous bit sequence stored in the memory and used for encoding a phase of a current bit sequence. The differential spreading encoder 102 encodes the phase of the bit sequence in such as way that a receiver can derive a spreading sequence with desirable cyclic auto correlation properties. The process of encoding the phase of the bit sequence is described in greater detail in FIG. 2. The differential spreading encoder 102 forwards the encoded phase of the bit sequence to the pulse generator 104.

The pulse generator 104 generates a number of pulses associated with the bit sequence based on the encoded phase of the bit sequence. It is appreciated that, the number of pulses generated is equal to a length of the bit sequence(step 403 in the FIG. 4). In one embodiment, the pulses generator 104 generates chirp pulses or series of short pulses associated with the bit sequence. A chirp pulse is a frequency modulated carrier pulse that spans over larger bandwidths (>500 MHz) and has excellent autocorrelation properties. The pulse generator 104 forwards the number of pulses generated to the DMPSK modulator 106. The DMPSK modulator 106 modulates the number of pulses by a phase of differential data symbol and generates a modulated signal(step 405 in the FIG. 4).

Additionally, the bit scrambler 108 and the phase selector 110 may be implemented in the transmitter 100 to correct direct current offset and reduce backoff in the modulated signal. In some embodiments, bits are inputted to the bit scrambler 108 to produce the randomized bits. In these embodiments, the input to the bit scrambler 108 may be the encoded bit sequence generated by the differential spreading encoder 102 in unipolar (1, 0) format. The phase selector 110 may use last 'k' bits (one bit for DBPSK, 2 bits for DQPSK, 3 bits for DBPSK and so on) from the randomized bits and select a random phase value from a DMPSK table using the encoded phase of the bit sequence(step 407 in the FIG. 4).

Accordingly, the bit scrambler 108 scrambles the modulated signal by multiplying the random phase value with the phase value of the modulated signal(step 409 in the FIG. 4). In one exemplary implementation, the bit scrambler 108 may include a linear feedback shift register (LFSR). The randomized bits may be inputted to the LFSR in such a manner that a bit which is taken as a function of the bits in the LFSR is fed back to the LFSR. The re-modulated signal is then forwarded to the DAC 112 which then converts the re-modulated signal into analogue form. The power amplifier 114 amplifies the analogue signal. The amplified signal is then transmitted to the receiver via an UWB network.

Figure 2:
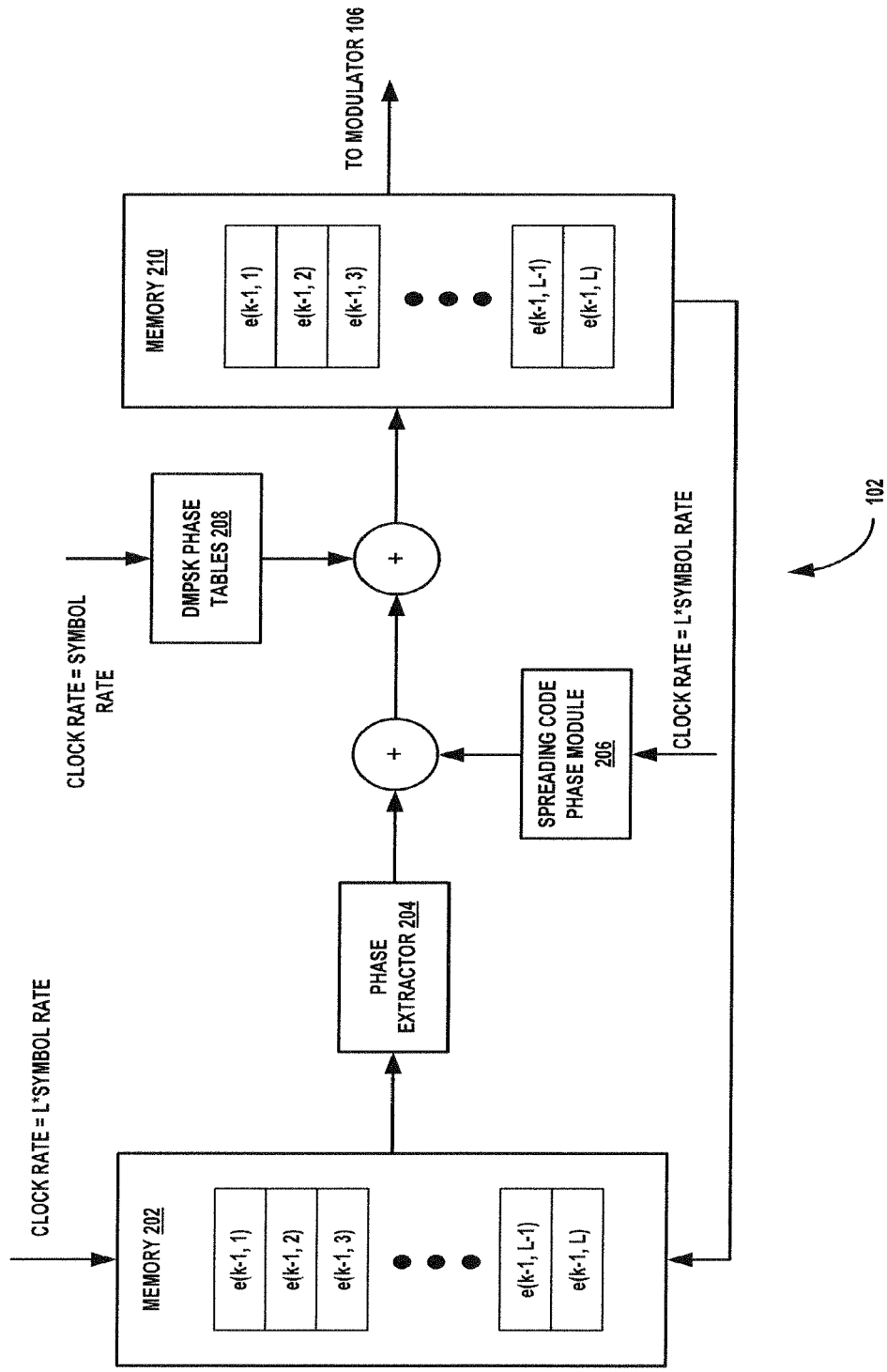
FIG. 2 illustrates an exploded view of a differential spreading encoder used in the transmitter of FIG. 1, according to one embodiment.

FIG. 2 illustrates an exploded view of the differential spreading encoder 102 used in the transmitter 100 of FIG. 1, according to one embodiment. The differential spreading encoder 102 includes memory 202, a phase extractor 204, a spreading code module 206, a DMPSK table 208, and memory 210. The phase extractor 204 extracts a phase value of a bit in the reference bit sequence from the memory 202. In one embodiment, the memory 202 includes phase values of bits in the reference bit sequence. The spreading code module 206 provides a phase value of a corresponding bit of a spreading code. The spreading code may include Kasami code, Barker code, maximum length code and so on.

Accordingly, the differential spreading encoder 102 generates an intermediate phase value by adding the phase value of the bit in the reference bit sequence with the phase value of the corresponding bit of the spreading code. Then, the differential spreading encoder 102 obtains a phase value of a differential data symbol from the DMPSK table 208 and generates a final phase value by adding the intermediate phase value and the phase value obtained from the DMPSK table 208. The differential spreading encoder 102 repeats the above steps for all bits in the reference bit sequence. The final phase values are stored in the memory 210 and are outputted to the pulse generator 104. In this manner, the differential spreading encoder 102 encodes a phase of a subsequent bit sequence based on the previous bit sequence stored in the memory 202 as given by following math FIG. 1:

$$\angle e(k,l) = \angle b(l) + \angle I(k) + \angle e(k-1, l)' \qquad \text{[Math FIG. 1]}$$

where, $\angle x$ denotes a phase angle of x, e(k, l) denotes a $k^{th}$ bit sequence with $l^{th}$ bit, b(l) denotes $l^{th}$ bit of a L-tuple spreading code, and I(k) is $k^{th}$ differential data symbol taken from the DMPSK table.

Figure 3:
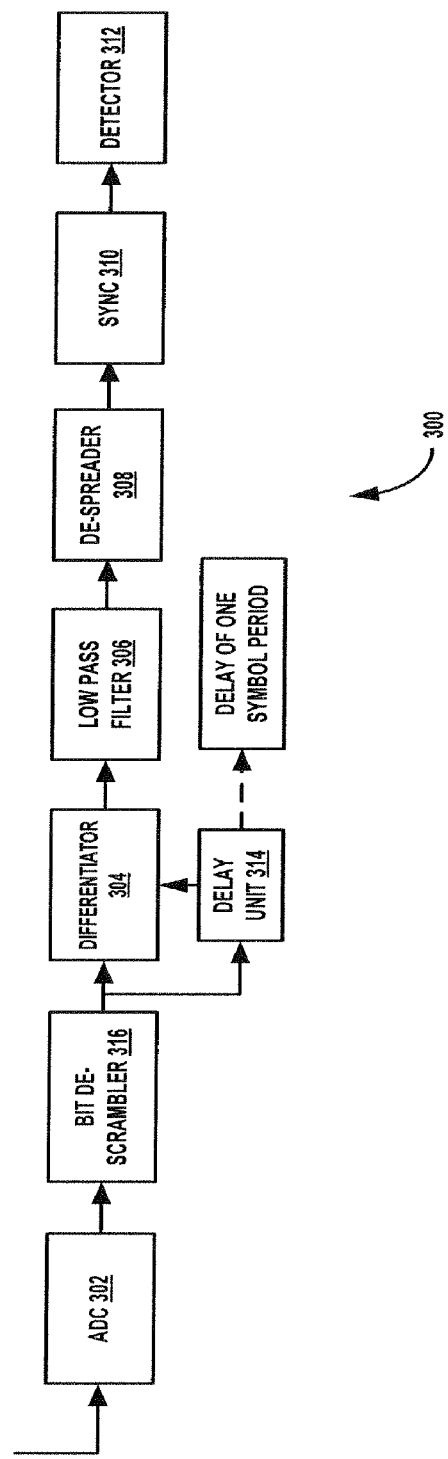
FIG. 3 illustrates a block diagram of an exemplary receiver in a pulse based low duty cycled UWB system, according to one embodiment.

FIG. 3 illustrates a block diagram of a receiver 300 in a chirp based low duty cycled ultra-wide band (UWB) system, according to one embodiment. FIG. 5 illustrates an operation process of an exemplary an receiver transmitter in a pulse based low duty cycled UWB system, according to one embodiment. In FIG. 3, the receiver 300 includes an analogue to digital converter (ADC) 302, a differentiator 304, a low pass filter (LPF) 306, a de-spreader 308, a synchronizer 310, a detector 312, and a delay unit 314. The receiver 300 may optionally include a bit de-scrambler 316.

In an exemplary operation, the ADC 302 coverts an analogue baseband signal received from the transmitter 100 into a digital baseband signal (herein after referred to as 'baseband signal'). The bit de-scrambler 316 descrambles the baseband signal to eliminate a random pulse value added in the baseband signal at the transmitter 100 (step 501 in the FIG. 5). The differentiator 304 then divides a modulated baseband data symbol in the baseband signal by a modulated baseband data symbol to obtain a spreading sequence having desired cyclic autocorrelation properties modulated with a differential data symbol (step 503 in the FIG. 5). The delay unit 314 may store the previous modulated baseband data symbol for providing to the differentiator.

The LPF 306 filters one or more frequencies from the spreading sequence having desired cyclic autocorrelation properties modulated with the differential data symbol to eliminate residual pulse shape frequency characteristics(step 505 in the FIG. 5). The despreader 308 then obtains a differential data symbol by multiplying a reference spreading sequence with the filtered spreading sequence having desired cyclic autocorrelation properties modulated with the differential data symbol(step 507 in the FIG. 5). The reference spreading sequence may include a Barker sequence, Kasami sequence, and maximum length sequence. It can be noted that, the operation of the synchronizer 312 (optional) and the detector 314 are well known to the person skilled in the art and hence explanation is thereof omitted.

In various embodiments, the above described transmitter and receiver of FIGS. 1-3 enable higher interference resistance for low data rates. The present invention uses spreading and order of modulation for scaling of data rates and keeps pulse on-off period constant for different data rates. This facilitates use of simple ADC/DAC with one sampling rate and a single filter. Moreover, the present invention reduces overall complexity of the low duty cycled UWB system.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

The invention claimed is:

1. A method of an ultra wide band (UWB) transmitter for generating a modulated signal, comprising:
    generating a bit sequence by differentially encoding a reference bit sequence based on a spreading sequence using a differential spreading encoder of the UWB transmitter;
    generating a number of pulses associated with the bit sequence based on the bit sequence using a pulse generator of the UWB transmitter, wherein a length of the number of pulses is equal to a length of the bit sequence; and
    generating a modulated signal through modulating the number of pulses using a phase of a differential data symbol by a DMPSK modulator of the UWB transmitter.

2. The method of claim 1, further comprising:
    selecting a random phase value from DMPSK table using the encoded phase of the bit sequence by a phase detector of the UWB transmitter; and
    scrambling the modulated signal by multiplying the random phase value with the phase value of the modulated signal using a bit scrambler of the UWB transmitter.

3. The method of claim 1, wherein generating a bit sequence by differentially encoding a phase of a reference bit sequence using a differential spreading encoder of the UWB transmitter comprises:
    extracting a phase value of a bit in the reference bit sequence from memory of the UWB transmitter;
    generating an intermediate phase value by adding the phase value of the bit in the reference bit sequence with a phase value of a corresponding bit of the spreading sequence;
    generating a final phase value by adding the intermediate phase value with a phase value obtained from DMPSK table;
    determining whether there are any bits left in the reference bit sequence;
    if so, repeating the steps of extracting, generating, and generating until all the bits in the reference bit sequence are extracted and processed; and
    if not, forwarding the final phase value associated with the reference bit sequence to the pulse generator.

4. The method of claim 3, wherein the reference bit sequence comprises a predefined bit sequence stored in the memory of the UWB transmitter.

5. The method of claim 3, wherein the reference bit sequence comprises a previous bit sequence processed by the differential spreading encoder.

6. The method of claim 1, wherein the spreading sequence is selected from the group consisting of a barker code, kasami code, and maximum length code.

7. The method of claim 1, wherein the number of pulses comprises chirp pulses or group of series of short pulses.

8. A transmitter of an ultra wide band (UWB) system comprising:
a differential spreading encoder configured to generate a bit sequence by differentially encoding a reference bit sequence based on a spreading sequence;
a pulse generator configured to generate a number of pulses associated the bit sequence using the bit sequence, wherein a length of the number of pulses is equal to a length of the bit sequence; and
a DMPSK modulator configured to generate a modulated signal through modulating the number of pulses using a phase of a differential data symbol.

9. The transmitter of claim 8, further comprising:
a phase detector configured to select a random phase value from DMPSK table using the encoded phase of the bit sequence; and
a bit scrambler configured to scramble the modulated signal by multiplying the random phase value with the phase value of the modulated signal.

10. The transmitter of claim 8, wherein in generating a bit sequence by differentially encoding a phase of a reference bit sequence using a differential spreading encoder of the UWB transmitter, the differential spreading encoder is further configured to extract a phase value of a bit in the reference bit sequence from memory of the low duty cycled UWB transmitter, generate an intermediate phase value by adding the phase value of the bit in the reference bit sequence with a phase value of a corresponding bit of the spreading sequence, generate a final phase value by adding the intermediate phase value with a phase value obtained from DMPSK table, determine whether there are any bits left in the reference bit sequence, repeat the steps of extracting, generating, and generating till all the bits in the bit sequence are extracted and processed if any bits are remaining, and forward the final phase value associated with the bit sequence to the pulse generator if all bits of the bit sequence are extracted and processed.

11. The transmitter of claim 10, wherein the reference bit sequence comprises a predefined bit sequence stored in the memory of the UWB transmitter.

12. The transmitter of claim 10, wherein the reference bit sequence comprises a previous bit sequence processed by the differential spreading encoder.

13. The transmitter of claim 8, wherein the spreading sequence is selected from the group consisting of a barker code, kasami code, and maximum length code.

14. The transmitter of claim 8, wherein the number of pulses comprises chirp pulses or a group of series of short pulses.

15. A method of an ultra wide band (UWB) receiver for processing a baseband signal received via an UWB network, comprising:
obtaining a spreading sequence having desired cyclic autocorrelation properties modulated with a differential data symbol through dividing a current modulated baseband data symbol associated with the baseband signal by a previous modulated baseband data symbol using a differentiator; and
obtaining a differential data symbol by multiplying a reference spreading sequence with the spreading sequence having desired cyclic autocorrelation properties modulated with the differential data symbol using a de-spreader.

16. The method of claim 15, wherein the reference spreading sequence is selected from the group consisting of a barker sequence, kasami sequence, and maximum length sequence.

17. The method of claim 15, further comprising:
descrambling the received baseband signal to eliminate a random pulse value in the received baseband signal using a de-scrambler.

18. The method of claim 15, further comprising:
filtering one or more frequencies from the spreading sequence having desired cyclic autocorrelation properties modulated with the differential data symbol to eliminate residual pulse shape frequency characteristics.

19. A receiver of an ultra wide band (UWB) system comprising:
a differentiator configured to obtain a spreading sequence having desired cyclic autocorrelation properties modulated with a differential data symbol through dividing a current modulated baseband data symbol associated with the baseband signal by a previous modulated baseband data symbol; and
a de-spreader configured to obtain a differential data symbol by multiplying a reference spreading sequence with the spreading sequence having desired cyclic autocorrelation properties modulated with the differential data symbol.

20. The receiver of claim 19, wherein the reference spreading sequence is selected from the group consisting of a barker sequence, kasami sequence, and maximum length sequence.

21. The receiver of claim 19, further comprising:
a bit descrambler configured to descramble the received baseband signal to eliminate a random pulse value in the received baseband signal.

22. The receiver of claim 19, further comprising:
a low pass filter configured to filter one or more frequencies from the spreading sequence having desired cyclic autocorrelation properties modulated with the differential data symbol to eliminate residual pulse shape frequency characteristics.

* * * * *